United States Patent
Downey et al.

(10) Patent No.: US 7,511,610 B2
(45) Date of Patent: Mar. 31, 2009

(54) MULTIPLE PASSENGER VEHICLE SEAT BELT NOTIFICATION SYSTEM WITH FORCE FEEDBACK

(75) Inventors: Brian Downey, Westland, MI (US); Michael Bunce, Ann Arbor, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 177 days.

(21) Appl. No.: 11/388,716

(22) Filed: Mar. 24, 2006

(65) Prior Publication Data

US 2007/0222572 A1    Sep. 27, 2007

(51) Int. Cl.
    *B60Q 1/00*    (2006.01)
(52) U.S. Cl. .............. 340/457.1; 340/407.1; 340/425.5; 340/438; 340/439
(58) Field of Classification Search .............. 340/457.1, 340/407.1, 425.5, 438, 439, 457
    See application file for complete search history.

(56) References Cited

U.S. PATENT DOCUMENTS

| | | | |
|---|---|---|---|
| 5,260,684 A | | 11/1993 | Metzmaker |
| 5,574,641 A | * | 11/1996 | Kawakami et al. ............. 701/1 |
| 5,605,202 A | * | 2/1997 | Dixon ......................... 180/268 |
| 6,215,395 B1 | | 4/2001 | Slaughter et al. |
| 6,362,734 B1 | | 3/2002 | McQuade et al. |
| 6,459,365 B2 | * | 10/2002 | Tamura ................... 340/425.5 |
| 6,796,567 B2 | * | 9/2004 | Shimizu et al. ........ 280/93.502 |
| 6,924,742 B2 | | 8/2005 | Mesina |
| 6,992,571 B2 | * | 1/2006 | Ota et al. ................. 340/407.1 |
| 2004/0178901 A1 | | 9/2004 | Ota et al. |
| 2005/0057350 A1 | | 3/2005 | Younse |

* cited by examiner

*Primary Examiner*—Daryl C Pope
(74) *Attorney, Agent, or Firm*—Young Basile

(57) ABSTRACT

A seat belt notification system and process for a vehicle can include an occupant detection sensor operable to determine if a vehicle seat is in one of an occupied condition or an unoccupied condition. A seat belt sensor can be operable to determine if a seat belt associated with the vehicle seat is in one of a buckled condition and an unbuckled condition. A feedback device can be operable to provide a physical response to a particular vehicle seat, if the occupant detection sensor determines that the particular vehicle seat is in an occupied condition and the seat belt sensor determines that the seat belt associated with the particular vehicle seat is in an unbuckled condition.

38 Claims, 2 Drawing Sheets

MULTIPLE PASSENGER VEHICLE SEAT BELT NOTIFICATION SYSTEM WITH FORCE FEEDBACK

FIELD OF THE INVENTION

The present invention relates to a multiple passenger vehicle seat belt notification system with force feedback.

BACKGROUND

Current prompting devices to notify a vehicle occupant to fasten a seat belt include an audible sound warning and/or an illuminated warning light or image display. U.S. Patent Application Publication No. US 2004/0178901 discloses a vibrator for vibrating a steering wheel and a controller for activating the vibrator when an ignition switch is turned on, and a seat belt fastening detector detects a seat belt as being unfastened. While these configurations appear to be suitable for their intended purpose, it would be desirable to provide a feedback device operable to provide a physical response to the vehicle seat, if an occupant detection sensor determines that the vehicle seat is in an occupied condition and a seat belt sensor determines that a seat belt associated with the occupied vehicle seat is in an unbuckled condition. It would be desirable for a feedback generating device to provide a physical response to a portion of the occupied vehicle seat. It would be desirable for the portion of the occupied vehicle seat to be selected from a group consisting of a cushion, a seatback, an armrest, a headrest, and any combination thereof. It would be desirable for the seat belt notification system to provide a physical notification to each occupied vehicle seat in an unbuckled condition. It would be desirable to operate a feedback device providing a physical response to an occupied vehicle seat in an unbuckled condition continuously or intermittently until the unbuckled condition of the seat belt associated with the occupied vehicle seat is corrected. It would be desirable to provide any of the above described features in any combination.

SUMMARY

A seat belt notification system for a vehicle can include an occupant detection sensor operable to determine if a vehicle seat is in one of an occupied condition and an unoccupied condition. A seat belt sensor can be provided operable to determine if a seat belt associated with the vehicle seat is in one of a buckled condition or an unbuckled condition. A feedback device can be operable to provide a physical response to the vehicle seat, if the occupant detection sensor determines that the vehicle seat is in an occupied condition, and if the seat belt sensor determines that the seat belt associated with the vehicle seat is in an unbuckled condition.

A method of providing a seat belt notification system in a vehicle can include determining if a seat in a vehicle is in an occupied condition or an unoccupied condition, determining if a seat belt for the seat is in a buckled condition or unbuckled condition, providing a physical response to the seat if the seat is determined to be in an occupied condition, and the seat belt is determined to be in an unbuckled condition.

A seat belt notification system for a vehicle can include means for determining which seats in a vehicle are in an occupied condition and an unoccupied condition, means for determining which seat belts are in a buckled condition or unbuckled condition, and means for providing a physical response to a seat, if that seat is determined to be in an occupied condition and is determined to be associated with a seat belt in an unbuckled condition.

A control program for a seat belt notification system for a vehicle can include determining which seats in a vehicle are in an occupied condition, determining which seat belts are in an unbuckled condition, and if any seats have an occupied condition and an associated seat belt in the unbuckled condition, activating a physical notification associated with each vehicle seat identified as being in an occupied condition in combination with an unbuckled condition of the seat belt.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
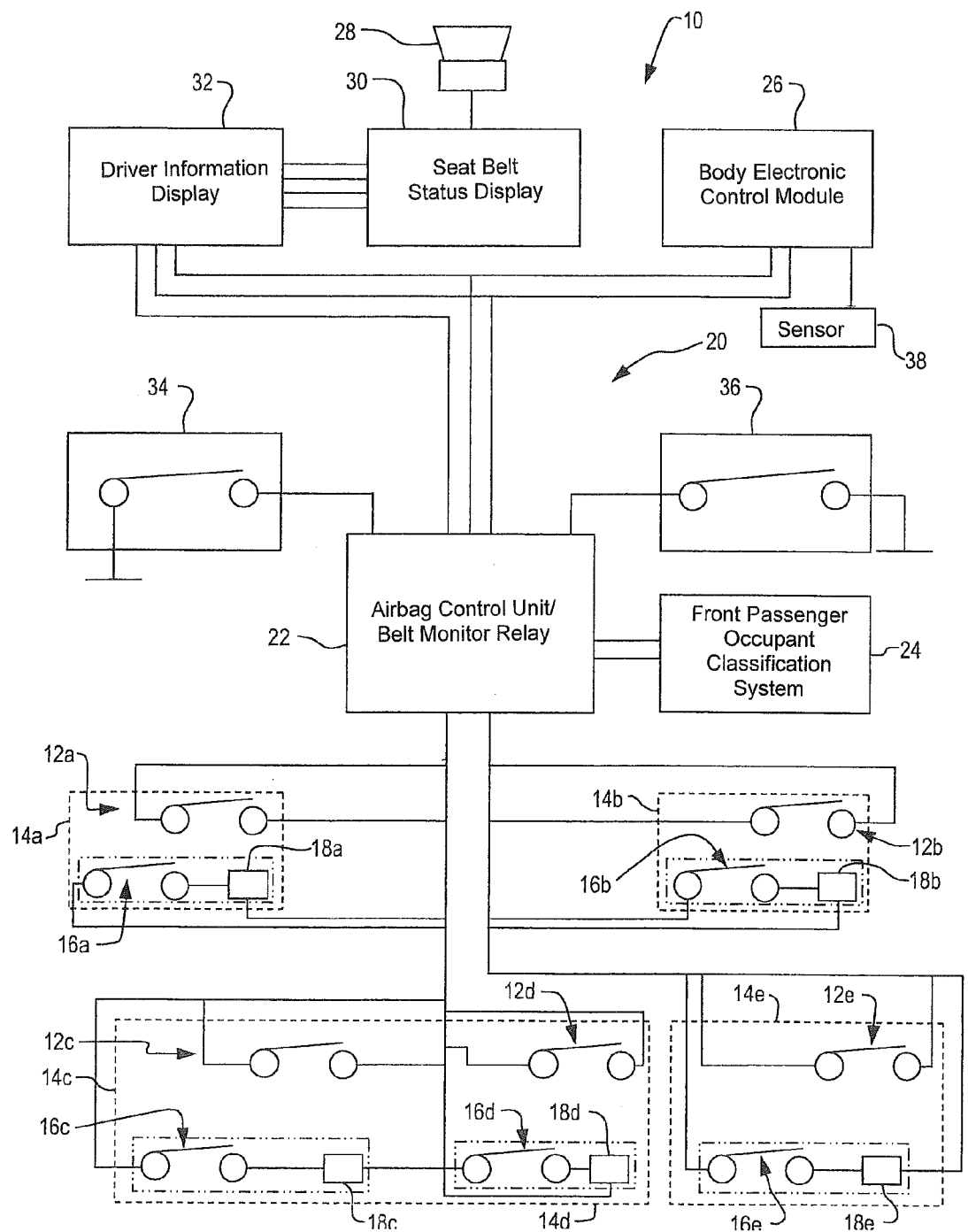
FIG. 1 is a schematic diagram of a multiple passenger vehicle seat belt notification system with forced feedback according to an embodiment of the present invention.

Referring now to FIG. 1, a simplified schematic diagram of a seat belt notification system 10 for a vehicle is illustrated. The seat belt notification system 10 can include at least one occupant detection sensor 12a, 12b, 12c, 12d, 12e operable to determine if at least one vehicle seat 14a, 14b, 14c, 14d, 14e is in one of an occupied condition and an unoccupied condition. At least one seat belt sensor 16a, 16b, 16c, 16d, 16e can be provided to determine if a seat belt associated with the corresponding vehicle seat 14a, 14b, 14c, 14d, 14e is in one of a buckled condition or an unbuckled condition. At least one feedback device 18a, 18b, 18c, 18d, 18e can be operable to provide a physical response to the corresponding vehicle seat 14a, 14b, 14c, 14d, 14e, if the associated occupant detection sensor 12a, 12b, 12c, 12d, 12e determines that the particular vehicle seat 14a, 14b, 14c, 14d, 14e is in an occupied condition, and the associated seat belt sensor 16a, 16b, 16c, 16d, 16e determines that the seat belt associated with the particular vehicle seat 14a, 14b, 14c, 14d, 14e is in an unbuckled condition. It should be recognized by those skilled in the art that an embodiment of the present invention can be used with any number of vehicle seats, and that the five passenger seats in FIG. 1, in addition to the driver seat and the front passenger seat, are illustrated by way of example and not limitation.

A controller 20 can be connected to the occupant detecting sensor 12a, 12b, 12c, 12d, 12e, the seat belt sensor 16a, 16b, 16c, 16d, 16e, and the feedback device 18a, 18b, 18c, 18d, 18e. The controller 20 can include an airbag control unit/belt monitor relay 22. The controller 20 can include a front passenger occupant classification system 24. The controller 20 can include a body electronic control module 26, audio alarm speaker 28, seat belt status display 30, and/or driver information display 32. As illustrated in an embodiment of the present invention shown in FIG. 1, the driver seat 34 and front passenger seat 36 may not include any corresponding feedback device. However, it should be recognized by those skilled in the art that a feedback device can be provided in the driver seat 34, and/or the front passenger seat 36, if desired. A vehicle movement sensor 38 can be connected to the controller 20 and operable to determine if the vehicle has moved a predetermined distance. The seat belt status visual display 30 can be associated with the driver information center console display 32, and can be connected to the controller 20. The seat belt status display 30 can be operable to display the particular vehicle seat 14a, 14b, 14c, 14d, 14e that is in an occupied condition and has an associated seat belt in an unbuckled condition.

The feedback device 18a, 18b, 18c, 18d, 18e can include a feedback generating device providing a physical response to a portion of the corresponding seat 14a, 14b, 14c, 14d, 14e. The portion of the corresponding vehicle seat 14a, 14b, 14c, 14d, 14e can be selected from a group consisting of a cushion, a seat back, an arm rest, a head rest, and any combination thereof. The feedback device 18a, 18b, 18c, 18d, 18e can include a vibrator associated with the corresponding vehicle seat 14a, 14b, 14c, 14d, 14e to provide the physical response. The vibrator can operate continuously, intermittently, or repeatedly through one or more different cycles until the corresponding seat belt associated with the vehicle seat 14a, 14b, 14c, 14d, 14e is in a buckled condition. The vibrator can cycle on and off during the unbuckled condition of the corresponding seat belt associated with the vehicle seat 14a, 14b, 14c, 14d, 14e.

Figure 2:
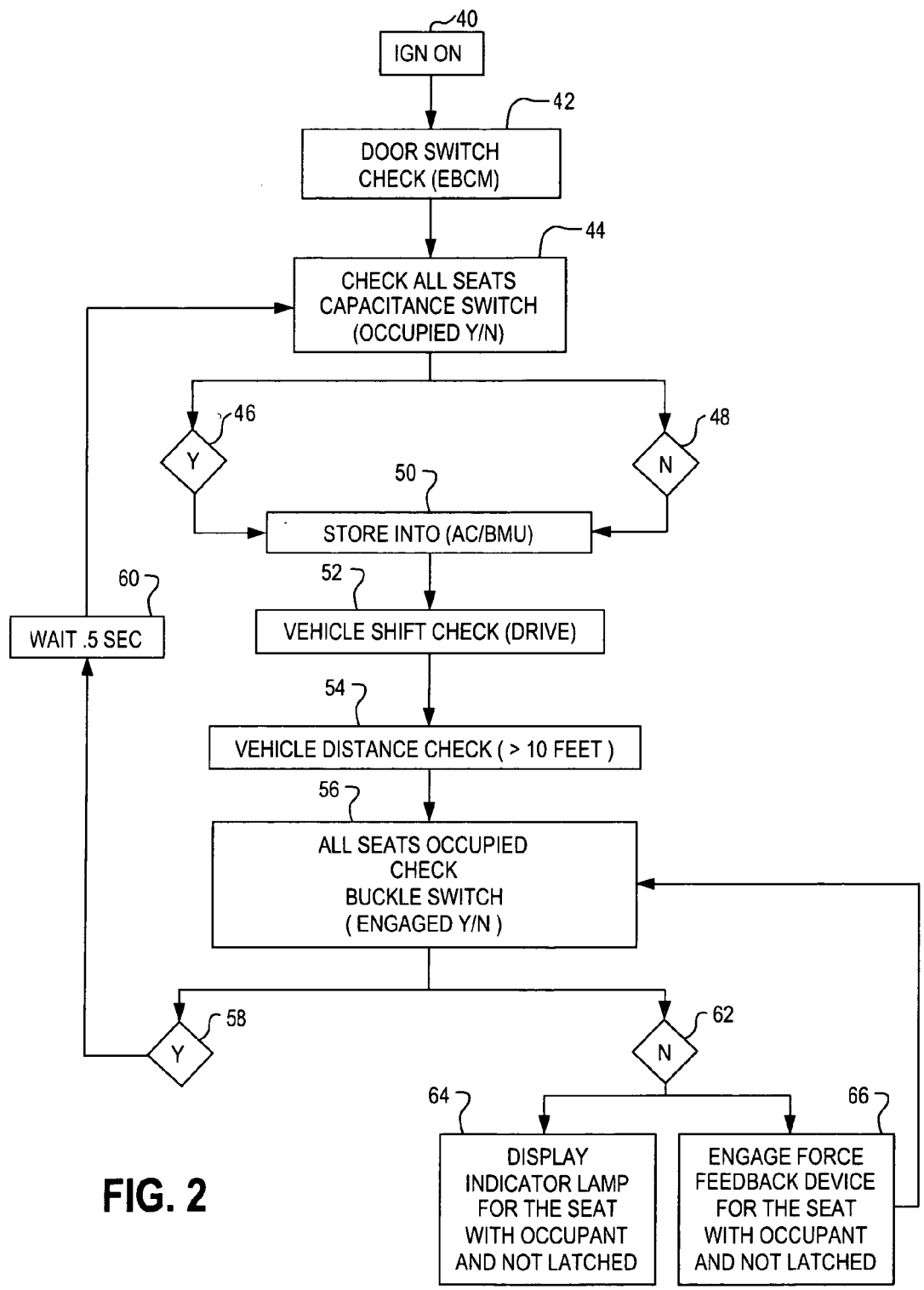
FIG. 2 is a simplified schematic flow diagram of a control program or process for a multiple passenger vehicle seat belt notification system with force feedback according to an embodiment of the present invention.

Referring now to FIG. 2, a process or method of providing a seat belt notification system 10 in a vehicle can include determining if the ignition is on as illustrated in flow diagram box 40. A door switch check can be performed by the electronic body control module 26 as illustrated in flow diagram box 42, an occupant detecting sensor 12a, 12b, 12c, 12d, 12e, such as a capacitance switch for all seats can be checked as illustrated in flow diagram box 44 to determine if each individual seat is in an occupied condition or in an unoccupied condition. The state of each seat capacitance switch, whether in an occupied condition as illustrated in the branch leading to flow diagram box 46 corresponding to "yes", or in an unoccupied condition as illustrated by the branch leading to flow diagram box 48 corresponding to "no", can be stored in the airbag control/belt monitor unit 22 as illustrated in flow diagram box 50. A check can be performed to determine if the transmission of the vehicle has been shifted into drive as illustrated in flow diagram box 52. The method or process of providing a seat belt notification system 10 in a vehicle can include a check to determine if the vehicle has moved a distance greater than a predetermined distance, by way of example and not limitation, such as 10 feet, as illustrated in flow diagram box 54. The process can also check all occupied seats to determine if the seat belt associated with the particular vehicle seat is in a buckled condition as illustrated in flow diagram box 56. If the answer to the query in flow diagram box 56 is "yes" as signified by the branch to flow diagram box 58, the process or method returns to the seat occupied query illustrated in flow diagram box 44. The branch returning to the seat occupied check flow diagram box 44 can be processed through a delay flow diagram box 60, if desired. The delay flow diagram box 60 can cause the control program or process to wait or delay a predetermined period of time prior to returning to seat occupied query flow diagram box 44. By way of example and not of limitation, delay box 60 can cause the control program or process to pause or wait for a 0.5 second delay, if desired. If the answer to the seat belt buckled query in flow diagram box 56 is "no" as illustrated by the branch to flow diagram box 62, the control program or process can proceed to flow diagram box 64, where a seat belt status visual display 30 or driver information center console display 32, by way of example and not limitation, such as a display indicator lamp, can be illuminated for each seat with an occupant where the seat belt is not latched. The control program or process can also continue from the flow diagram box 62 to flow diagram box 66, where a force feedback device 18a, 18b, 18c, 18d, 18e can be engaged for the particular seat 14a, 14b, 14c, 14d, 14e with an occupant where the associated seat belt sensor 16a, 16b, 16c, 16d, 16e indicates an unbuckled condition of the seat belt. The control program or process can return from flow diagram box 66 to the seat belt buckled query of flow diagram box 56 where the seat belts of any occupied seats are checked to determine if the seat belts are in the buckled condition.

The process or method, according to an embodiment of the present invention, can provide a seat belt notification system in a vehicle including a determination if a seat in a vehicle is in an occupied condition or an unoccupied condition, determining if a seat belt for the corresponding seat is in a buckled condition or an unbuckled condition, and providing a physical response to the seat, if the seat is determined to be in an occupied condition while the seat belt is determined to be in an unbuckled condition. The process or method of providing a physical response can include receiving an output signal from an occupant detection sensor 12a, 12b, 12c, 12d, 12e and an associated seat belt sensor 16a, 16b, 16c, 16d, 16e for the particular seat 14a, 14b, 14c, 14d, 14e with a controller 20, and activating the physical response with the controller 20 in response to the output signals received in accordance with a control program.

The method according to an embodiment of the present invention can include determining if the vehicle has moved a predetermined distance. The determination if the vehicle has moved a predetermined distance can include a determination if the transmission of the vehicle has been shifted into drive, as illustrated in flow diagram box 52, and a determination if the vehicle has moved a predetermined distance, such as illustrated in flow diagram box 54. It should be recognized that the distance of greater than 10 feet is given by way of example and not of limitation, and that any suitable distance can be set as desired.

The process or method according to an embodiment of the present invention can include displaying visually an indication of any vehicle seat that is in an occupied condition and has an associated seat belt in an unbuckled condition, as illustrated in flow diagram box 64. Providing a physical response as illustrated in flow diagram box 66, can include applying a force feedback stimulation to a portion of the corresponding vehicle seat 14a, 14b, 14c, 14d, 14e found to be in an occupied condition and having an associated seat belt in an unbuckled condition. The portion of the vehicle seat 14a, 14b, 14c, 14d, 14e can be selected from a group consisting of a cushion, a seat back, an arm rest, a head rest, and any combination thereof. The providing of a physical response as illustrated in flow diagram box 66 can include vibrating at least a portion of the vehicle seat 14a, 14b, 14c, 14d, 14e to alert an occupant of the vehicle seat of the unbuckled condition of the seat belt associated with that particular vehicle seat 14a, 14b, 14c, 14d, 14e.

It should be recognized that an embodiment of the present invention can be applied to one or more of the vehicle seats, or can be applied to all vehicle seats, if desired. Further, it should be recognized that an embodiment of the present invention can provide a physical response to an individual vehicle seat that is occupied with an unbuckled seat belt, or can provide a physical response to all of the vehicle seats that are occupied with an unbuckled seat belt, or can provide a physical response to additional seats, if desired, such as to any occupied seats adjacent to the occupied seat having an unbuckled seat belt, or to all occupied seats, if desired. The vibration of at least a portion of a vehicle seat can include repeatedly vibrating at least a portion of the vehicle seat 14a, 14b, 14c, 14d, 14e until the seat belt associated with the vehicle seat 14a, 14b, 14c, 14d, 14e is in a buckled condition. The vibration of at least a portion of the vehicle seat 14a, 14b, 14c, 14d, 14e can include cycling the vibration on and off during an unbuckled condition of a seat belt associated with the particular vehicle seat 14a, 14b, 14c, 14d, 14e.

A seat belt notification system 10 for a vehicle according to an embodiment of the present invention can include means for determining which seats in a vehicle are in an occupied condition or in an unoccupied condition, means for determining which seat belts are in a buckled condition or an unbuckled condition, and means for providing a physical response to any particular seat if the seat is determined to be in an occupied condition and the seat belt associated with that particular occupied seat is determined to be in an unbuckled condition. A control program for a seat belt notification system 10 for a vehicle according to an embodiment of the present invention can include determining which seats in a vehicle are in an occupied condition, determining which seat belts are in an unbuckled condition, and if any seats have an occupied condition and an associated seat belt in the unbuckled condition, activating a physical notification associated with each vehicle seat identified as being in an occupied condition in combination with an unbuckled condition of the associated seat belt.

The multiple passenger vehicle seat belt latching notification system with force feedback according to an embodiment of the present invention can provide a seat belt reminder system for all occupants of a vehicle when coupled to the occupant presence detection for all seating positions within the vehicle. The system can feedback to the driver a status of all possible seat belt locations after the vehicle has been moved forward a predetermined distance. The system can check for belted condition changes (latched to unlatched and vice versa) with the feature of occupied seat detection inclusion checking for both status of buckle switch changes and unbelted occupants at occupied seating positions.

The seat belt reminder and force feedback system according to an embodiment of the present invention allows the driver of the vehicle to know which occupants of the vehicle have failed to engage the seatbelt tongue into the buckle mechanism of the associated occupied seat. Along with a display that the driver can view on an information center console, the occupant in the seat with an unlatched seat belt can receive a force feedback stimulation from the seat (cushion, seat back, head rest, and/or arm rest) to notify the occupant that the seat belt needs to be buckled or latched. The force feedback can be strategically located near or touching an area of the seat supporting the occupant, so that the vibrations would be noticed by the occupant in the particular seat position being notified of the unbuckled condition of the associated seat belt. The system overall can have the ability to know if occupants are sitting in specific seats as the vehicle begins to move forward. If the occupant in a particular seat has an unbuckled seat belt condition, the indicator lamp in the driver information display can be illuminated. At the same time, the force feedback device can start to vibrate in the particular seat corresponding to the unbuckled seat belt location. The vibration can be similar to the type of vibration received from a game station "shock-type" controller, or a telephone or pager on a vibration setting. The vibration can run until the buckle of the seat belt is latched with the tongue. The vibration cycle, by way of example and not limitation, can last for approximately two to three seconds with an approximately five to six second delay between cycles of vibration.

While the invention has been described in connection with what is presently considered to be the most practical and preferred embodiment, it is to be understood that the invention is not to be limited to the disclosed embodiment but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A seat belt notification system for a vehicle comprising:
   an occupant detection sensor operable to determine if a vehicle seat is in one of an occupied condition and an unoccupied condition;
   a seat belt sensor operable to determine if a seat belt associated with the vehicle seat is in one of a buckled condition and an unbuckled condition; and
   a feedback device operable to provide a physical response to the vehicle seat, if the occupant detection sensor determines that the vehicle seat is in the occupied condition and the seat belt sensor determines that the seat belt associated with the vehicle seat is in the unbuckled condition.

2. The system of claim 1 further comprising:
   a controller connected to the occupant detection sensor, the seat belt sensor, and the feedback device.

3. The system of claim 2 further comprising:
   a vehicle movement sensor connected to the controller and operable to determine if the vehicle has moved a predetermined distance.

4. The system of claim 2 further comprising:
   a visual display associated with a driver information center console and connected to the controller, the visual display operable to display the vehicle seat when it is in the occupied condition and the associated seat belt in the unbuckled condition.

5. The system of claim 1, wherein the feedback device further comprises:
   a feedback generating device providing the physical response to a portion of the vehicle seat.

6. The system of claim 5, wherein the portion of the vehicle seat is selected from a group consisting of a cushion, a seatback, an armrest, a headrest, and any combination thereof.

7. The system of claim 1, wherein the feedback device further comprises:
   a vibrator associated with the vehicle seat to provide the physical response.

8. The system of claim 7, wherein the vibrator operates until the seat belt associated with the vehicle seat is in the buckled condition.

9. The system of claim 7, wherein the vibrator cycles on and off during the unbuckled condition of the seat belt associated with the vehicle seat.

10. A method of providing a seat belt notification system in a vehicle comprising:
    determining if a seat in the vehicle is in an occupied condition or an unoccupied condition;
    determining if a seat belt for the seat is in a buckled condition or an unbuckled condition; and
    providing a physical response to at least one of the first vehicle seat and a second vehicle seat, if the first vehicle seat is determined to be in the occupied condition and the seat belt is determined to be in the unbuckled condition.

11. The method of claim 10, wherein providing the physical response further comprises:
    receiving an output signal from an occupant detection sensor and a seat belt sensor with a controller; and activating the physical response with the controller in response to the output signals received in accordance with a control program.

12. The method of claim 10 further comprising: determining if the vehicle has moved a predetermined distance.

13. The method of claim 10 further comprising: displaying visually an indication that the first vehicle seat is in the occupied condition and the seat belt in the unbuckled condition.

14. The method of claim 10, wherein providing the physical response further comprises: applying a force feedback stimulation to a portion of at least one of the first vehicle seat and the second vehicle seat.

15. The method of claim 14, wherein the portion of the vehicle seat is selected from a group consisting of a cushion, a seatback, an armrest, a headrest, and any combination thereof.

16. The method of claim 10, wherein providing the physical response further comprises: vibrating at least a portion of at least one vehicle seat to alert an occupant of the unbuckled condition of the seat belt for the first vehicle seat.

17. The method of claim 16, wherein vibrating at least the portion of the vehicle seat further comprises: repeatedly vibrating the portion of at least one vehicle seat until the seat belt for the first vehicle seat is in the buckled condition.

18. The method of claim 16, wherein the vibrating at least the portion of the at least one vehicle seat further comprises: cycling the vibration on and off during the unbuckled condition of the seat belt for the first vehicle seat.

19. The method of claim 10, wherein the first vehicle seat is a driver seat.

20. The method of claim 19, wherein providing the physical response further comprises providing the physical response to the first vehicle seat.

21. The method of claim 19, wherein providing the physical response further comprises providing the physical response to both the first vehicle seat and the second vehicle seat.

22. The method of claim 10, wherein the first vehicle seat is a passenger seat.

23. The method of claim 22, wherein the second vehicle seat is one of a driver seat and a passenger seat that is adjacent to the first vehicle seat.

24. A seat belt notification system for a vehicle comprising: means for determining which seats in a vehicle are in an occupied condition or in an unoccupied condition; means for determining which seat belts are in a buckled condition or in an unbuckled condition; and means for providing a physical response to at least one of the seats in the occupied condition, if the seat belt associated with the occupied condition is determined to be in the unbuckled condition.

25. A control program for a seat belt notification system for a vehicle comprising, the control program causing a controller of the seatbelt notification system to perform the following: determining which seats in the vehicle are in an occupied condition; determining which seat belts are in an unbuckled condition; and if any of the seats have the occupied condition and the associated seat belt in the unbuckled condition, activating a physical notification associated with each seat identified as being in the occupied condition in combination with the unbuckled condition of the associated seat belt.

26. The control program of claim 25, further comprising causing the controller to perform the following: activating a physical notification associated With at least one additional seat identified as being in the occupied condition.

27. A seat belt notification system for a vehicle having at least a first vehicle seat and a second vehicle, seat, comprising: an occupant detection sensor operable to determine if the first vehicle seat is in one of an occupied condition and an unoccupied condition; a seat belt sensor operable to determine if a seat belt associated with the first vehicle seat is in one of a buckled condition and an unbuckled condition; and a feedback device operable to provide a physical response to at least one of the first vehicle seat and the second vehicle, seat, if the occupant detection sensor determines that the first vehicle seat is in the occupied condition and the seat belt sensor determines that the seat belt associated with the first vehicle seat is in the unbuckled condition.

28. The system of claim 27, wherein the first vehicle seat is a driver seat and the feedback device is operable to provide the physical response to the first vehicle seat.

29. The system of claim 27, wherein the first vehicle seat is a passenger seat.

30. The system of claim 29, wherein the feedback device is operable to provide the physical response to the first Vehicle seat.

31. The system of claim 29, wherein the feedback device is operable to provide the physical response to both the first vehicle seat and the second vehicle seat.

32. The system of claim 31, wherein the second vehicle seat is one of a driver seat and a passenger seat that is adjacent to the first vehicle seat.

33. The system of claim 29, wherein the feedback device is operable to provide the physical response to the second vehicle seat.

34. The system of claim 33, wherein the second vehicle seat is one of a driver seat and a passenger seat that is adjacent to the first vehicle seat.

35. The system of claim 29, wherein the occupant detection sensor is operable to determine if the second vehicle seat is in one of the occupied condition and the unoccupied condition, and the feedback device is further operable to provide the physical response to the second seat if the occupant detection sensor determines that the second vehicle seat is in the occupied condition.

36. The system of claim 35, wherein the feedback device is further operable to provide the physical response to both the first vehicle seat and the second vehicle seat if the occupant detection sensor determines that the second vehicle seat is in the occupied condition.

37. The system of claim 35, wherein the feedback device is further operable to provide the physical response only to the second vehicle seat if the occupant detection sensor determines that the second vehicle seat is in the occupied condition.

38. The system of claim 35, wherein the second vehicle seat is one of a driver seat and a passenger seat that is adjacent to the first vehicle seat.

* * * * *